June 22, 1926.

E. T. REARDON 1,589,817

INSULATING MEANS

Filed August 8, 1925

INVENTOR
E. T. Reardon
BY E. C. Huffman
ATTORNEY

Patented June 22, 1926.

1,589,817

UNITED STATES PATENT OFFICE.

EARL T. REARDON, OF ST. LOUIS, MISSOURI, ASSIGNOR TO WAGNER ELECTRIC CORPORATION, OF ST. LOUIS, MISSOURI, A CORPORATION OF DELAWARE.

INSULATING MEANS.

Application filed August 8, 1925. Serial No. 48,934.

My invention relates to means for insulating coils of dynamo electric machines whereby a single insulating member serves to insulate the bottom coil from the top coil in a slot, and also to insulate the free ends of coils at cross-over points.

The employment of insulating strips of a construction embodying my invention, materially decreases the time required in applying coils by means of a winding machine, and provides insulation between coils at cross-over points which cannot slip out of place.

Figure 1:
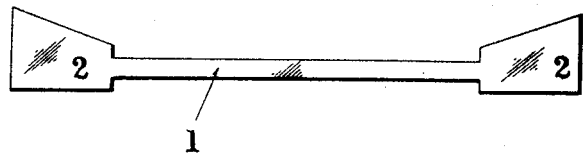
Figure 2:
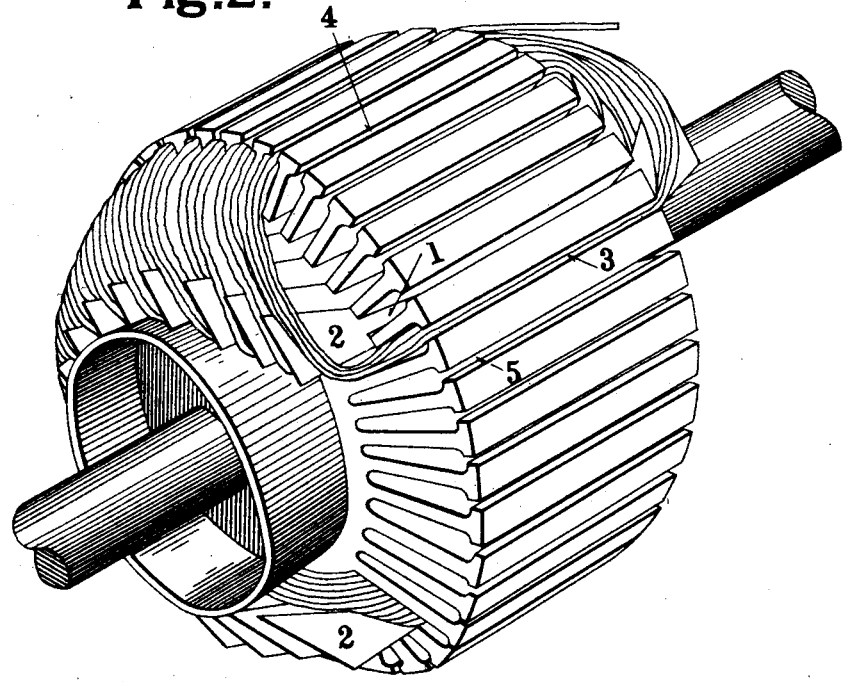

In the accompanying drawings Figure 1 illustrates an insulating strip constructed in accordance with my invention, and Figure 2 is a perspective view showing the manner of its application to a wound slotted member of a dynamo electric machine.

The insulating strip 1 is made of tough paper or other suitable insulating material, and is provided with enlarged ends 2. The intermediate portion of the strip is of only slightly greater length than the slot in which it is to be positioned, and in example of its use shown, lies between the coils in a slot and insulates them from each other. The enlarged ends of the strip project over a free end of a coil at a point where another coil crosses it and thus insulates the free ends from each other at these points. The enlarged ends are of sufficient width to overlap the ends of the strip in an adjacent slot. Since the enlarged ends cannot pass through the slots longitudinal motion of the insulating strip in either direction is prevented and the strip cannot slip into a position where its ends fail to insulate two coils at cross-over points.

In continuing the winding of the partially wound rotor shown in Figure 2, an insulating strip would be placed in slot 3 over the coil shown therein, and a coil then applied to slots 4 and 5. Then an insulating strip is placed in slot 5 and the succeeding coil wound into position, and so on.

It will be apparent that employment of insulating strips constructed in accordance with my invention constitutes a convenient, economical, and reliable method of insulating coils from each other both in the slots and at cross-over points.

Having fully described my invention, what I claim as new and desire to secure by Letters Patent of the United States is:

1. An insulating means for a dynamo electric machine having winding slots, which comprises a strip of insulating material having enlarged ends and an intermediate portion adapted to be positioned in a winding slot.

2. An insulating means for a dynamo electric machine having winding slots, which comprises a strip of insulating material having enlarged ends and an intermediate portion adapted to be positioned in a winding slot, all parts of the strip lying substantially in a single plane.

3. The combination with a slotted member of a dynamo electric machine, of an insulating strip positioned in a slot and extending beyond the ends thereof, said strip being provided with means limiting the longitudinal motion of the strip in the slot.

4. The combination with a slotted member of a dynamo electric machine, of an insulating strip positioned in a slot and extending beyond the ends thereof, said strip being provided with enlarged portions adapted to engage the slotted member to limit the longitudinal motion of the strip in the slot.

5. In a dynamo electric machine, the combination of a member provided with winding slots and coil windings therein, of an insulating member positioned between conductors in a slot and having enlarged ends lying between the free ends of coils at the points where they cross each other.

6. The combination with a slotted member of a dynamo electric machine, of insulating strips positioned in said slots and extending beyond the ends thereof, the ends of each strip being sufficiently wide to overlap the end of the insulating strip in one of the immediately adjacent slots.

In testimony whereof, I have hereunto set my hand this the 22nd day of July, 1925.

EARL T. REARDON.